United States Patent [19]

Sigworth, Jr.

[11] 4,314,667
[45] Feb. 9, 1982

[54] THERMAL EXPANSION CHECK VALVE

[75] Inventor: Harry W. Sigworth, Jr., Orinda, Calif.

[73] Assignee: Chevron Research Company, San Francisco, Calif.

[21] Appl. No.: 216,577

[22] Filed: Dec. 15, 1980

[51] Int. Cl.³ ............................................. G05D 23/00
[52] U.S. Cl. .................................. 236/93 R; 126/434; 137/468; 137/533.11; 251/11
[58] Field of Search ................ 126/434, 419; 251/11; 137/468, 533.11, 533.13, 533.15; 236/93 R, 99 J

[56] References Cited

U.S. PATENT DOCUMENTS

| | | | |
|---|---|---|---|
| 2,105,893 | 1/1938 | Salmonsen | 137/533.11 X |
| 3,563,305 | 2/1971 | Hay | 126/434 X |
| 3,610,275 | 10/1971 | Determan | 137/533.11 X |
| 3,620,228 | 11/1971 | Schmid | 137/533.11 X |
| 4,192,290 | 3/1980 | Jensen | 126/419 X |
| 4,201,626 | 5/1980 | Asdigian | 137/533.11 X |
| 4,245,617 | 1/1981 | Buckley | 126/434 |
| 4,258,700 | 3/1981 | Vaseen | 126/434 X |

FOREIGN PATENT DOCUMENTS 1242310 6/1959 France .

*Primary Examiner*—William E. Tapolcai, Jr.
*Attorney, Agent, or Firm*—Edward J. Keeling; R. H. Evans

[57] ABSTRACT

A ball check valve is provided for use in a thermosiphoning solar energy system. The valve is extremely sensitive to low pressure variations and will permit reverse thermosiphoning above specified operating temperatures.

10 Claims, 2 Drawing Figures

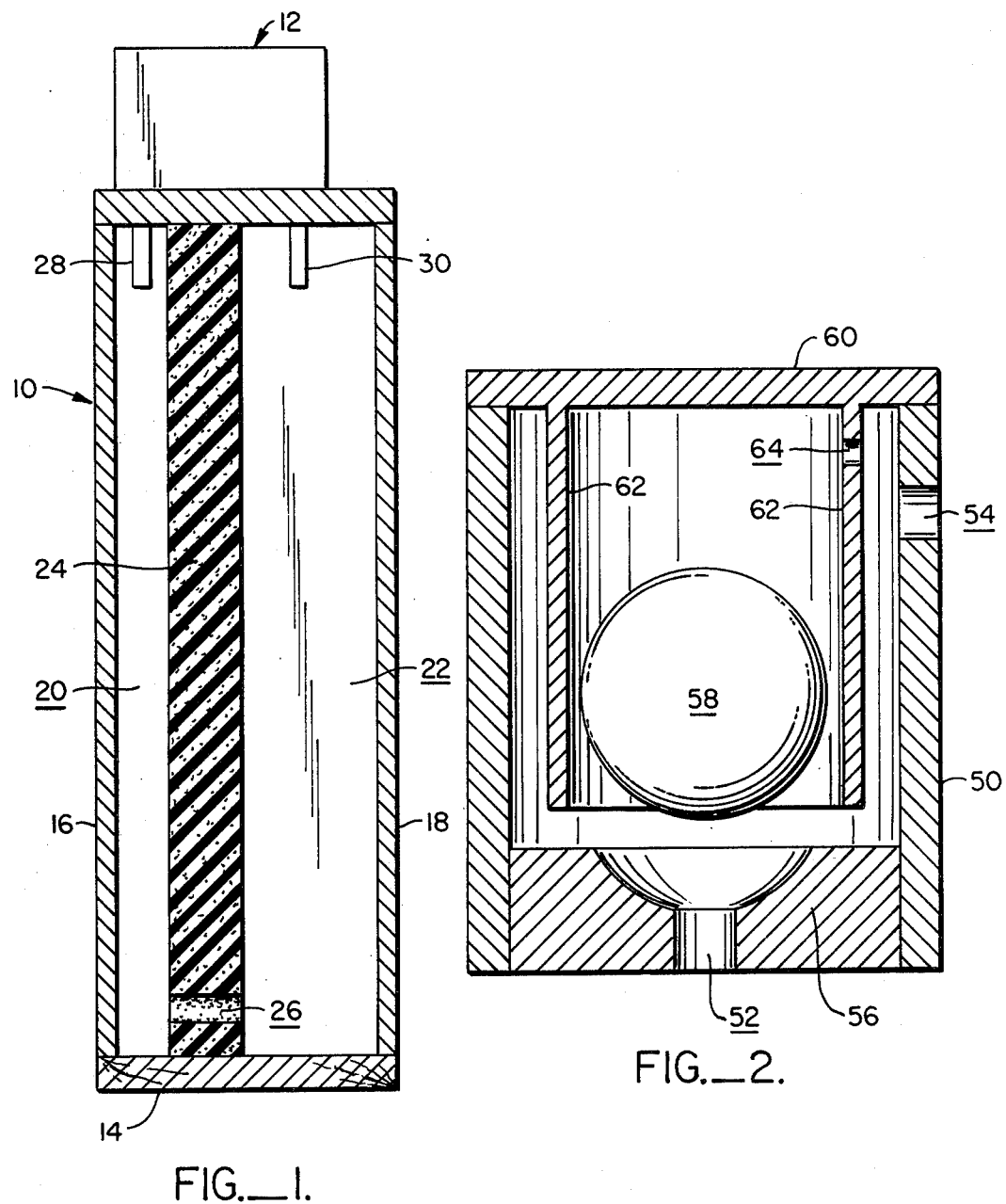

THERMAL EXPANSION CHECK VALVE

BACKGROUND OF INVENTION

1. Field of Invention

The present invention finds principal application within the field of passive solar energy systems. More particularly, the invention relates to a sensitive check valve for use in solar panels which employ a thermosiphoning loop of liquid to convectively transfer heat.

2. Prior Art

With the dwindling supplies of fossil fuel and the accompanying increasing energy costs, extensive research efforts are being focused to harness solar radiation on a practical and economical scale. One type of device which shows promise in the field is the thermosiphon system, described in U.S. Pat. No. 4,137,964 issued to Bruce Shawn Buckley and in U.S. application Ser. No. 6,767, filed Jan. 26, 1979, by the same inventor.

As disclosed in the above references, a "thermic diode" panel is used to collect and store the sun's radiant energy. The panel typically comprises a shallow rectangular box that is effectively divided into two chambers by a slab of insulation. The chambers are filled with a liquid, such as water, and are in open communication with each other at the bottom of the panel via a passage through the insulation, and in communication at the top through flow control means, normally located outside the panel proper. A preferred flow control means discussed in the reference is an "oil valve".

Solar radiation incident on the outer panel face will heat the water in the adjacent chamber. As the water expands it passes upwardly through the oil valve and into the cooler storage chamber, setting up a thermosiphon loop. Cooler water from the storage chamber, in turn, passes through the insulation passage at the bottom of the panel to the warmer collector chamber.

If such a panel is used during the day to collect solar energy and store the heat for night time use, reverse thermosiphoning must be avoided to prevent energy loss. The oil valve achieves this objective and, in addition, increases the sensitivity of the thermosiphoning process to small temperature differences between the chambers. However, it is also desirable for the valve to permit reverse flow at high temperatures to prevent overheating and possible damage to the panel.

It is therefore an objective of the present invention to provide an inexpensive alternative to the oil valve which will function at low pressure differences, exhibit low pressure drops, prevent reverse thermosiphoning under normal conditions and permit reverse flow if high temperatures are encountered in the storage chamber.

SUMMARY OF THE INVENTION

The present invention relates to a valve which comprises: a housing having a lower fluid port and an upper fluid port; a valve seat interposed in the housing between said ports; and a valve member movably disposed in the housing above the valve seat. The valve member is designed to have a density greater than the fluid at or below a specified normal operating temperature and a density less than the fluid above the specified normal operating temperature. This characteristic allows the member to sealingly engage the valve seat by gravity action to prevent the downward flow of fluid if the operating temperature is at or below the specified normal operating temperature but disengage from the valve seat to permit the upward flow of fluid. The valve member will also disengage from the valve seat due to buoyant forces to permit the downward flow of fluid if the operating temperature is above the specified normal temperature.

Preferably, the valve member has a spherical shape and the valve seat has a mating configuration.

BRIEF DESCRIPTION OF THE DRAWINGS

FIG. 1 illustrates a cross-section of a thermosiphon solar panel equipped with a valve made in accordance with the present invention.

FIG. 2 illustrates a preferred embodiment of the valve of the present invention.

DETAILED DESCRIPTION OF THE PREFERRED EMBODIMENTS

Referring to FIG. 1 there is shown a typical thermosiphon type of solar panel, generally referred to by reference No. 10 and a valve for use with the panel, generally referred to by reference No. 12.

As shown therein, the panel is comprised of a peripheral frame 14 covered with sheets 16 and 18. The interior of the panel is divided into chambers 20 and 22 by an insulating slab 24. The lower portions of chambers 20 and 22 are in open communication with each other through passage 26 in the bottom of insulation slab 24. The upper portions of chambers 20 and 22 are in communication through line 28, valve 12, and line 30.

In operation, the panel chambers are filled with liquid, such as water, or water with additives, such as antifreeze. Solar radiation incident on sheet 16 warms the water in chamber 20 relative to the water in chamber 22. As a result of the temperature induced density differences between water in the chambers, warm water is forced by thermosiphon action through line 28, valve 12, and line 30 into the top of chamber 22 and cool water at the bottom of chamber 22 enters chamber 20 through the passage in the insulation slab.

Energy for heating purposes may be taken from chamber 22 by forced air convection across sheet 18, free convection across sheet 18, radiation from sheet 18 or through a conventional heat exchanger placed within chamber 22.

Referring now to FIG. 2 of the drawings, there is shown a cross-section of a valve constructed in accordance with the teachings of this invention. As shown therein, there is provided a housing 50 having lower and upper ports 52 and 54, respectively, for the passage of liquid therethrough. There is also provided a spherically shaped valve seat 56 having an aperture through which all fluid passing through the valve must flow. Although the valve seat is shown as a separate part in the figure, it is within the spirit and scope of this invention to manufacture the seat directly from the housing walls as a unitary body. If the valve seat is separately fabricated, as indicated in the drawing, it may be secured to the inner housing walls in any conventional manner. A spherical valve member 58 is movably disposed within the housing above valve seat 56.

While the shapes of the valve seat and mating valve member are preferably spherical, other shapes such as circular seats with conical valve members, square seats with inverted pyramidal valve members, frustro-conical seats with spherical valve members and the like may also be used.

Valve member 58 will preferably have a density quite close to the density of the liquid flowing through the valve at its normal operating temperature to minimize the pressure drop and increase the valve sensitivity. Thus, if water is used as a circulating fluid and the solar panel is installed for preheating water to a hot water heater, the water will normally be heated to a temperature in the range of 70° F. (21.1° C.) to 180° F. (82.2° C.) before passing through the valve. At these temperatures, the density of pure water ranges from 60.5 lb/ft$^3$ (0.97 g/cm$^3$) to 62.3 lb/ft$^3$ (0.998 g/cm$^3$) and the density of the valve member will preferably be no greater than 105% and more preferably no greater than 101% of the water density.

Under normal operating conditions the heated water from chamber 20 will pass upwardly through line 28 (see FIG. 1) into the lower port 52 (see FIG. 2) of the valve. The upward flow and pressure forces will displace valve member 58 from seat 56, thereby permitting the water to flow around the member and out through port 54. However, if the water is warmer in chamber 22 than in chamber 20, the water will tend to flow from chamber 22 through lines 28 and 30 to chamber 20. The force of gravity, in combination with fluid forces, under these conditions, will cause member 58 to lodge in valve seat 56 thereby preventing reverse thermosiphon flow.

Although no special materials of construction are required for the valve housing and seat, apart from those dictated by standard engineering considerations, the valve member materials must exhibit certain characteristics. In addition to the density requirements set forth above, the valve member must be designed so that at temperatures above the desired operating temperature the member will become buoyant in the circulating fluid.

In general, materials may be selected for the valve member which have a density greater than water at the operating temperature and which thermally expand at rates faster than water to become buoyant at the higher temperatures. One such valve member construction material which meets this criteria is glass reinforced polypropylene. It should also be noted that the material selected need not necessarily by homogeneous, but may be comprised of two or more materials such as plastic with metal weights embedded therein, or hollow ground thermometer glass balls with weighted resin centers.

Cap 60 conventionally seals the top of housing 50 and provides a means of access to the interior thereof. Extending from the bottom of cap 60 is a guide cylinder 62 having an inner diameter greater than the diameter of spherical valve member 58. The lower end of guide member 62 preferably extends at least below the center of seated member 58. Whenever member 58 is unseated due to its buoyancy at high temperatures or due to the upward flow of fluid through port 52, the spherical member will be confined to travel within the interior regions of guide cylinder 62, thereby preventing obstruction of port 54 and aiding in reseating of the member under appropriate conditions. Relief aperture 64, provided near the top of cylinder 62, permits fluid to escape from the interior of the guide cylinder if the valve member is moving upwardly and permits fluid to enter the cylinder if the valve member is moving downwardly. Although the size of the aperture is not critical, a one-eighth inch diameter hole has been found satisfactory.

With a guide means, such as cylinder 62, the valve may be inclined as much as 70° from the vertical axis, and the valve member will still seat properly under flow rates typical in thermosiphon solar systems.

What is claimed is:

1. A valve which comprises:
    a housing having a lower fluid port and an upper fluid port;
    a valve seat interposed in said housing between said ports;
    a valve member movably disposed in said housing above the valve seat, which has a density greater than the fluid at or below the specified normal operating temperature and a density less than the fluid above the specified normal operating temperature, which valve member will sealingly engage the valve seat to prevent the downward flow of fluid if the operating temperature is at or below the specified normal operating temperature, but which will disengage from the valve seat to permit the upward flow of fluid, and which will also disengage from the valve seat to permit the downward flow of fluid if the operating temperature is above the specified normal operating temperature.

2. A valve as recited in claim 1, wherein said fluid is a liquid.

3. A valve as recited in claim 2 wherein said valve member is spherically shaped and said valve seat is also spherically shaped to receive said valve member.

4. A valve as recited in claim 2 wherein said specified normal operating temperature is in the range, 70°–180° F.

5. A valve as recited in claim 2 wherein said fluid is water or water with additives.

6. A valve as recited in claim 2 wherein said valve member has a density less than five percent greater than the liquid density at the normal operating temperature.

7. A valve as recited in claim 2 wherein said valve member is comprised of glass reinforced polypropylene.

8. A valve as recited in claim 2 wherein the materials of construction for said valve member are nonhomogeneous.

9. A valve for a passive solar panel having a liquid thermosiphoning loop which comprises:
    a housing having a lower port and an upper port;
    a valve seat interposed between said ports;
    a valve member movably disposed in said housing above the valve seat, which has a density greater than said liquid at or below the specified normal operating temperature and a density less than said liquid above the specified normal operating temperature, which valve member sealingly engages the valve seat to prevent the downward flow of liquid if the temperature is at or below the specified normal operating temperature as a result of the force of gravity, but disengages from the valve seat as a result of fluid pressures to permit the upward flow of liquid, and disengages from the valve seat a result of buoyant forces to permit the downward flow of liquid if the temperature is above the specifed normal operating temperature; and
    guide means for receiving the unseated valve member.

10. A valve as recited in claim 9 wherein said specified normal operating temperature is in the range 70°–180° F.

* * * * *